April 22, 1930. J. KURKOWSKI 1,755,994
HOT PUNCHING AND SHEARING MACHINE
Filed Feb. 11, 1927 4 Sheets-Sheet 3

Inventor
Joseph Kurkowski
By Emery, Booth, Janney & Varney
his Attorneys

April 22, 1930.   J. KURKOWSKI   1,755,994
HOT PUNCHING AND SHEARING MACHINE
Filed Feb. 11, 1927   4 Sheets-Sheet 4

Inventor

Joseph Kurkowski

By Emery, Booth, Janney & Varney
his Attorneys

Patented Apr. 22, 1930

1,755,994

UNITED STATES PATENT OFFICE

JOSEPH KURKOWSKI, OF CARRICK, PENNSYLVANIA, ASSIGNOR TO JONES & LAUGHLIN STEEL CORPORATION, OF PITTSBURGH, PENNSYLVANIA, A CORPORATION OF PENNSYLVANIA

HOT PUNCHING AND SHEARING MACHINE

Application filed February 11, 1927. Serial No. 167,461.

This invention aims to improve the product of punching or shearing machines of the press type, particularly such articles as are produced from heated bars or strips, and to improve the construction and operation of the machines therefor.

Among the objects and advantages sought and attained are a clean cut severing of the bar or strip stock without deformation of any part of the resulting article, and the provision of automatic means for feeding the stock and removing the articles as formed. Other advantages of the invention appear in connection with the following description of the construction and mode of operation of a tie plate press embodying the invention.

Tie plates and similar ribbed or grooved articles are commonly made by severing portions of proper length from a suitably ribbed or grooved strip or bar of metal, usually formed by rolling or drawing from a heated bar or billet. Such articles are difficult to sever from the bar stock by ordinary knife blade shearing machines without buckling or crushing the ribs or distorting the flat body of the article.

In the drawings, which show a press of the crank and gear type,

Figure 5:
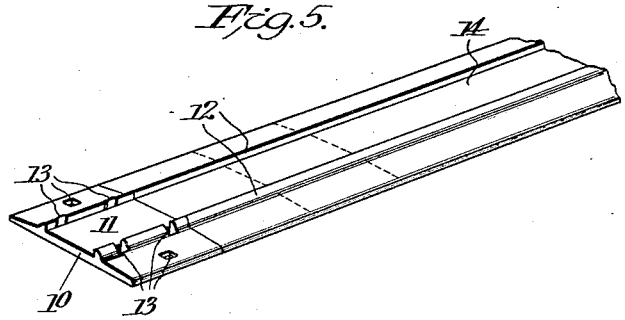

The tie plate 10 (see Fig. 5) is provided with a flat middle seat portion 11 for the rail, formed between ribs 12, and the side margins are punched with holes 13 suitably spaced for the spikes that hold it and the rail in place on the tie. The bottom is flat. The invention enables accurately finished tie plates to be produced from a suitably shaped rolled bar 14 by simultaneously stamping and severing them, a completed plate being produced at each stroke of the press without further treatment.

Figure 1:
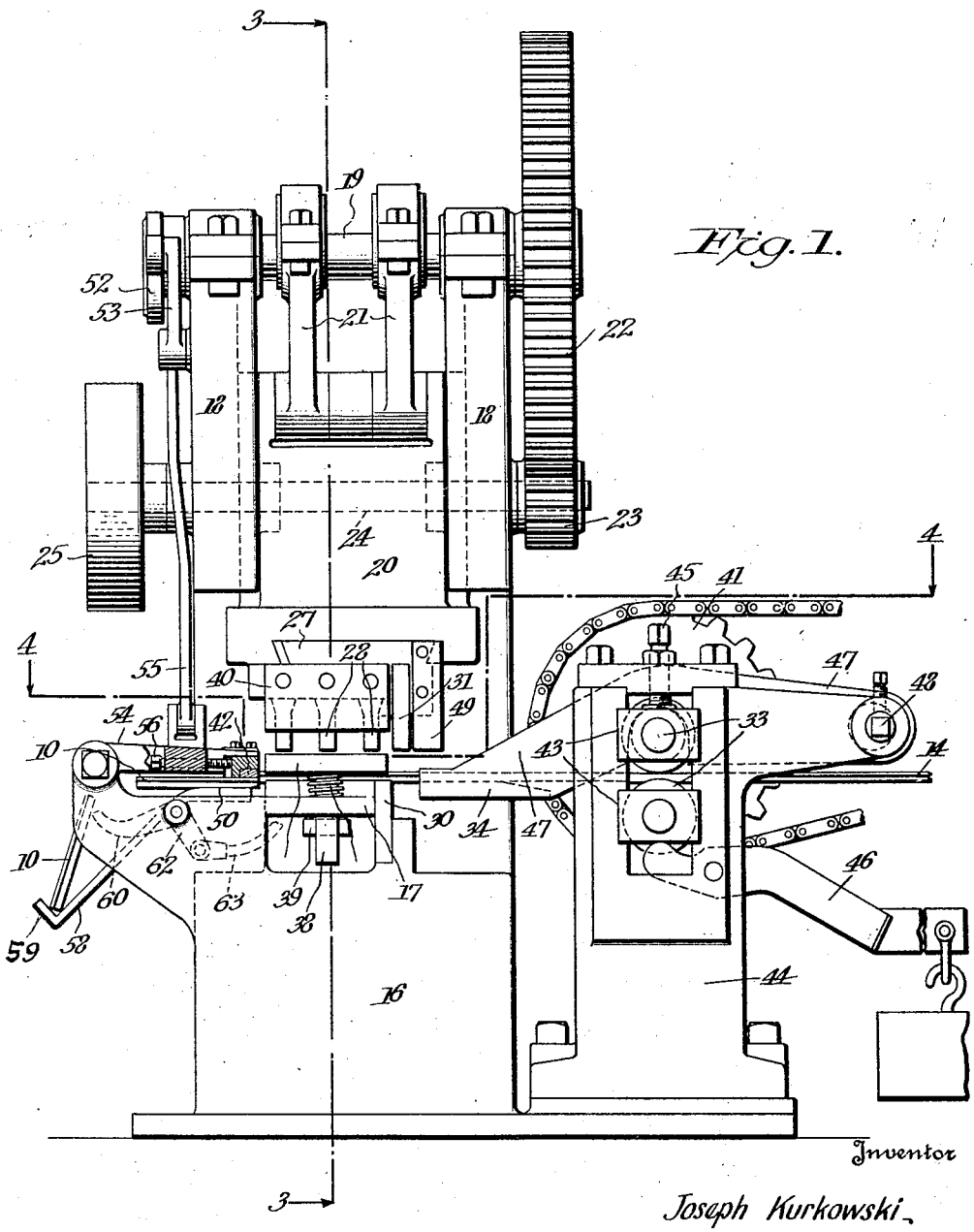
Fig. 1 is a front view showing the feeding and delivery mechanism in elevation.
Figure 2:
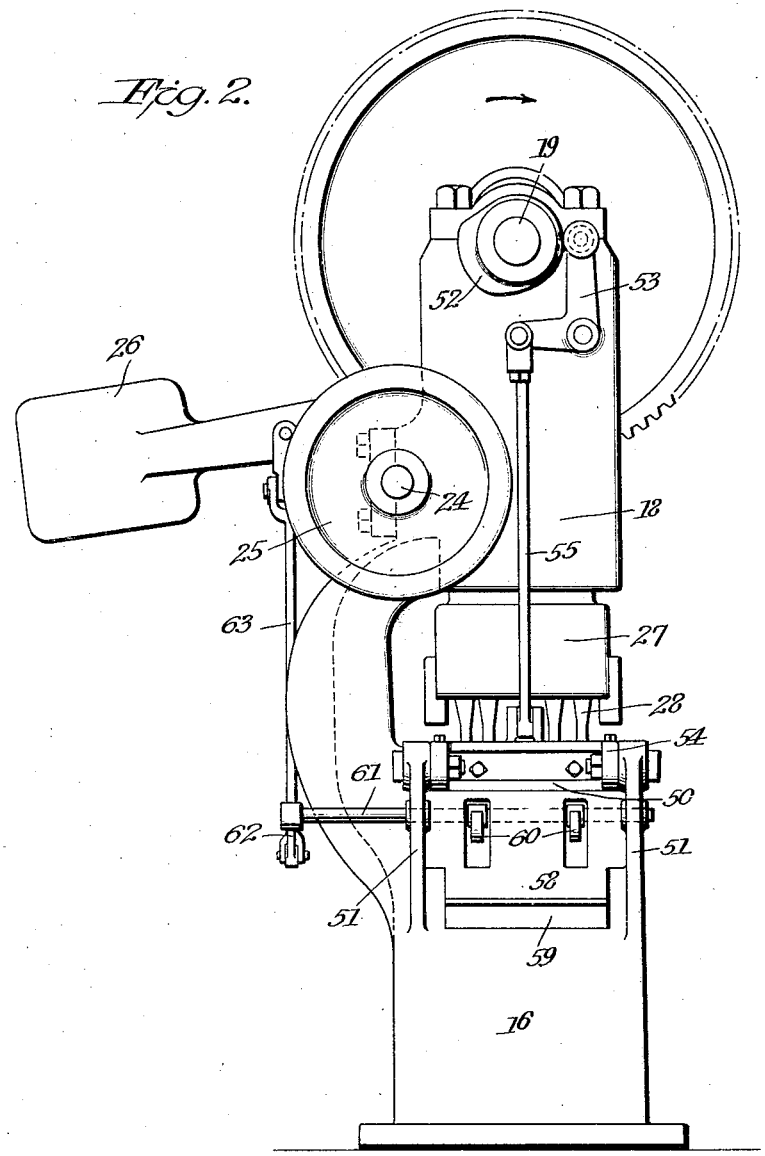
Fig. 2 is a side elevation of the press showing the delivery side.

Referring to Figs. 1, 2 and 2, the press is of known type, having a base 16, die block 17, side rails 18 supporting an eccentric shaft 19, and press head 20 sliding between the rails and actuated from the shaft by connecting rods 21. The crank shaft is rotated by means of reduction gears 22, 23, from a driving shaft 24, which may be rotated from a suitable motor by means of a belt and pulley 25 or other means. A counterweight 26 is provided for balancing part of the weight of the press head and punch and knife block 27 carried thereby.

Figure 3:
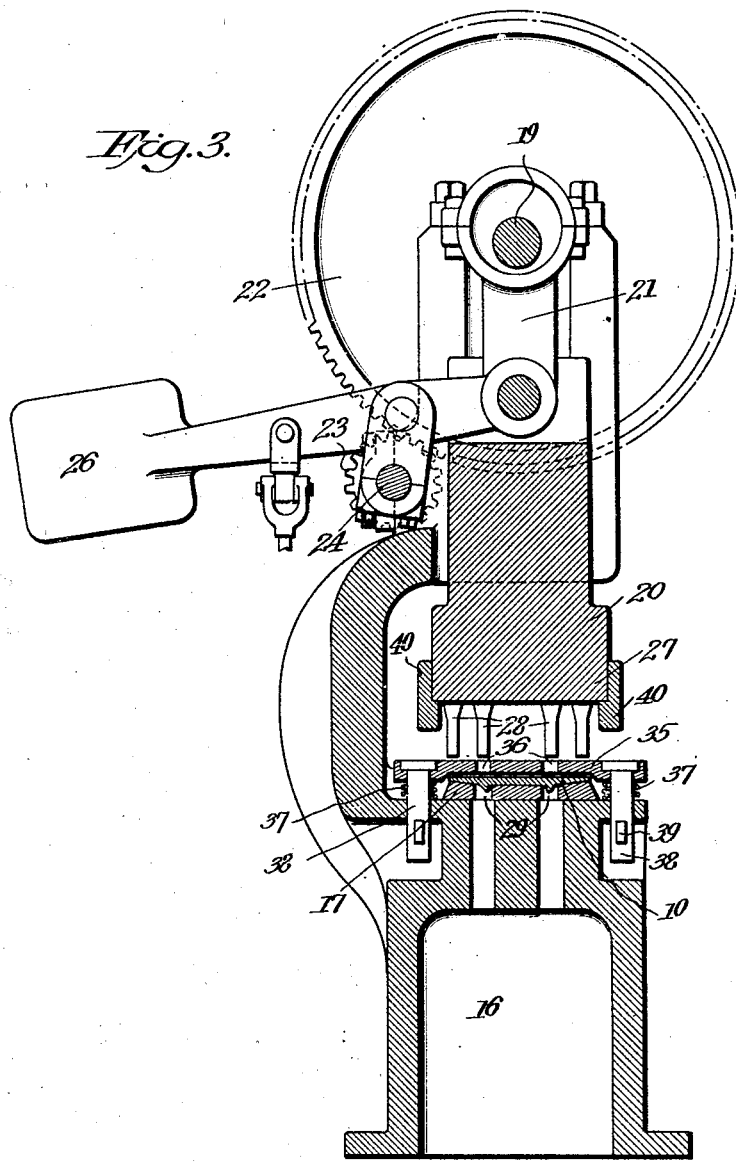
Fig. 3 is a vertical cross-section on the line 3—3 in Fig. 1, looking in the direction of the arrows.
Figure 4:
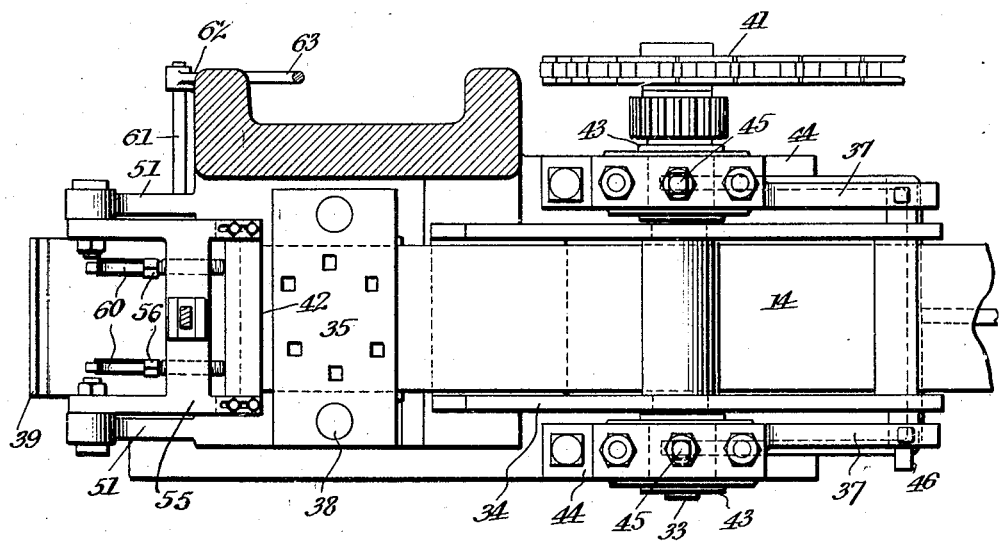
Fig. 4 is a horizontal cross-section on the line 4—4 in Fig. 1. A finished tie plate and portion of the bar stock from which it is made are shown in Fig. 5 in perspective.

The punches 28 are mounted in the punch block 27 and work through corresponding holes 29 in the die block 17 (see Figs. 3 and 4) which is shaped to conform to the ribbed side of the tie plate, as shown in Fig. 3. The lower knife 30 is fixed in the die block on the entering side of the bar 14, and the movable knife 31 is mounted outside of and above it in the punch block 27, as shown in Fig. 1. The bar stock is fed between the knives on the die block by means of suitable feed rolls 33 and a tilting guide 34 as hereinafter described.

A stripper plate 35, having holes 36 for the punches, is supported above the die block by means of springs 37, and is held against upward movement by means of bolts 38 which project through the top of the base below the die block and are provided with keys or stops 39, to prevent the tie plate from being lifted with the punches when they ascend after punching the spike holes. Gags 40 on the punch block strike the stripper plate at the lower end of the stroke and force it down on the tie plate to flatten and straighten it in case it has been distorted or bent during its previous stages of manufacture or during the severing and punching operation.

The feed rolls 33 are geared together and rotated intermittently to feed the bar stock, which is pinched between them, by means of a chain gear 41 or other suitable driving device actuated by a motor and reducing gearing, not shown. Preferably the feed roll driving motor is provided with electric control means actuated by the movement of the stock and reciprocations of the press head, as described in my Patent No. 1,499,537, dated July 1, 1924, whereby the motor is stopped when the end of the bar hits the gage stop 42 and is properly positioned on the die block, and is not started until the press head has partly completed its return or up stroke.

The feed rolls are mounted in sliding blocks 43 in the housings 44 which are normally held up against the adjusting screws 45 by means of a counterweighted yoke lever 46 having its yoke end pivoted in recesses or slots in the housings 44, with its extremities engaging under the lower feed roll journal blocks, as shown in Fig. 1. The stock guide 34 is carried by two arms 47 which are saddled over the inner ends of the upper roll blocks 43 and pivoted at their extremities on an eccentric shaft 48, whereby the height of the guide with reference to the feed rolls may be adjusted. A gag block 49 on the punch block 27 strikes the guide 34 as the upper knife enters the work and depresses the guide, which in turn depresses the feed rolls to a lesser extent. Thereby as the stock is forced down with the knife, the ribs on its under side are put in tension immediately adjacent to the die block, tending to prevent them from buckling, and producing a clean cut. The guide supports the stock near the knives and prevents bending at the cut edge. As the punch block ascends, the guide is permitted to rise, and the counterweighted lever 46 lifts the feed rolls, guide and stock to bring the end of the latter slightly above the top of the die block.

As the press head rises the feed rolls start feeding the stock towards the die block 17, and the severed tie plate is pushed ahead of the end of the bar of stock and off of the die block onto a receiving platform 50 on the base, between the arms 51 that support the gage stop 42, the latter being slightly raised at this time by the cam 52 on the crank shaft and the bell crank 53 mounted on the side of the adjacent rail 18, to which the pivoted plate 54 that carries the gage stop is connected by means of a rod 55. The position of the gage stop may be adjusted to suit the width of tie plate by means of the screws 56. During the feeding movement of the stock, the cam 52 drops the gage stop and it rests on the severed tie plate until the latter drops off on to the platform 50, at which time the gage stop drops to its lower position in line with the end of the advancing stock, which hits it and stops.

The tie plate is severed and punched in inverted position, that is, with its ribs down instead of uppermost, and it is desirable to turn it over before delivering it upon a conveyor or other means for removing it from the press. For this purpose an inclined apron or rack 58 is suspended beneath the platform 50, and when the gage stop 42 is lifted by the cam 52 immediately following the descent of the press head, the tie plate, at that time resting flat on the platform where it has been held by the gage stop plate, tilts over into the rack, where it rests upon the ledge 59 at its lower edge. A pair of arms 60 carried by an oscillating shaft 61 journaled beneath the platform 50 engage the tie plate and flip its upper edge outward and over the ledge 59, about which its lower edge pivots, thereby inverting it and delivering it right side up upon a moving conveyor or other receptacle. The shaft 61 has an arm 62 at its rear end which is connected to the counterweight 26 by means of a rod 63, thereby causing the shaft to oscillate in time with the press head, the arms 60 moving outwards to deliver a tie plate as the press head ascends.

The operation of the device is entirely automatic, and the shearing and punching can be done rapidly without buckling the ribs or distorting the plate. Moreover, any slight irregularities in the stock due to uneven cooling or reheating will be eliminated, so that the tie plates leave the press completely finished ready for inspection and shipment.

The invention is not restricted to machines for producing the particular articles described, nor to the identical manner of treatment and design of press and associated mechanisms, as it is obvious that it may be embodied in other forms and ways.

I claim the following as my invention:

1. For the production of ribbed articles of the character described from a length of ribbed stock, relatively movable cooperating shearing means, and means for presenting the stock to the shearing means, said stock presenting means being movable relative to the cutting point to stress the stock in a manner to avoid excessive compression of the ribs adjacent the cutting point during the cutting operation and means for moving said stock presenting means.

2. For the production of ribbed articles of the character described from a length of ribbed stock, relatively movable cooperating shearing means, and means for presenting the stock to the shearing means, said stock presenting means engaging the stock at a point adjacent to the knives and at a point remote therefrom and being movable relative to the cutting point to stress the stock in the direction to tension the ribs adjacent the cutting point during the cutting operation, and means for moving said stock presenting means.

3. For the production of ribbed articles of the character described from a length of ribbed stock, relatively movable cooperating shearing means, and means for guiding the stock to the shearing means, said guiding means having feeding means associated therewith, and said guiding and feeding means being movable relative to the cutting point to stress the stock in the direction to tension the ribs adjacent the cutting point during the cutting operation, and means for moving said stock presenting means.

4. A press for cutting off blanks from non-rigid strips comprising a stationary knife block, feeding mechanism, a movable knife between the stationary knife block and the feeding mechanism and means actuated in timed relation with the knife for engaging the strip between said knife and feeding mechanism to support it during the cutting operation.

5. A press for cutting off blanks from non-rigid strips comprising a stationary knife block, feeding mechanism, a movable knife between the stationary knife block and the feeding mechanism and means carried by the feeding mechanism and actuated in timed relation with the knife for engaging the strip between said knife and feeding mechanism to support it during the cutting operation.

6. A press for cutting off blanks from non-rigid strips comprising a stationary knife block, feeding mechanism, a movable knife between the stationary knife block and the feeding mechanism and pivoted guide means provided with a counterweight for engaging the strip between said knife and feeding mechanism to support it during the cutting operation.

7. A press for cutting off blanks from non-rigid strips comprising a stationary knife block, feeding mechanism, a movable knife between the stationary knife block and the feeding mechanism and guide means for engaging the strip between said knife and feeding mechanism to support it during the cutting operation, said guide means being movable vertically to position the cut end of the strip in line with the top of the stationary knife block following the cutting operation.

8. A press for cutting off blanks from non-rigid strips comprising horizontal feeding rolls mounted for vertical movement, a knife block, a vertically movable knife positioned between said feeding rolls and knife block, a guide between said rolls and knife, and means for moving said rolls and guide in the same direction as said knife during the cutting operation to prevent buckling the work.

9. In a feeding device for strip shearing presses and the like, in combination with a stock feeding means and a die block across which the stock to be sheared is fed from one side, a gage positioned adjacent the edge of the die block remote from the feeding means and movable from and into alinement with the end of the stock on the die block, and means actuated by the movement of the press for shifting said gage out of alinement with the end of the sheared strip and permitting it to slide thereon as the sheared strip is pushed from the block by the end of the advancing stock so arranged that when the sheared strip clears the die block the gage will return to alined position to stop the stock in position for shearing.

10. A shearing press comprising a die block provided with a knife, means for feeding the stock to said die block, a gage on the side of said block remote from the feeding means, said gage being arranged above and movable into alinement with the line of feed of said stock, a receiving platform for said stock below said gage whereby a piece of severed stock lying thereon will support said gage in alinement with the end of the stock being fed on to said die block, and means for lifting said gage to clear the end of the stock when severed to permit it to move beneath it on to said platform.

11. A shearing press comprising a die block provided with a knife, means for feeding the stock to said die block, a gage on the side of said block remote from the feeding means, said gage being arranged above and movable into alinement with the line of feed of said stock, a receiving platform for said stock below said gage whereby a piece of severed stock lying thereon will support said gage in alinement with the end of the stock being fed on to said die block, and means for lifting said gage to clear the end of the stock when severed to permit it to move beneath it on to said platform, said platform being shorter than the severed stock whereby when said gage is lifted the piece of stock will tilt off from the platform.

12. A shearing press comprising a die block provided with a knife, means for feeding the stock to said die block, a gage on the side of said block remote from the feeding means, said gage being arranged above and movable into alinement with the line of feed of said stock, a receiving platform for said stock below said gage whereby a piece of severed stock lying thereon will support said gage in alinement with the end of the stock being fed on to said die block, and means for lifting said gage to clear the end of the stock when severed to permit it to move beneath it on to said platform, an inclined shelf below the edge of said platform, said platform being shorter than the severed stock whereby when said gage is lifted the piece of stock will tilt off from the platform on to said shelf.

13. A shearing press comprising a die block provided with a knife, means for feeding the stock to said die block, a gage on the side of said block remote from the feeding means, said gage being arranged above and movable into alinement with the line of feed of said stock, a receiving platform for said stock below said gage whereby a piece of severed stock lying thereon will support said gage in alinement with the end of the stock being fed on to said die block, and means for lifting said gage to clear the end of the stock when severed to permit it to move beneath it on to said platform, an inclined shelf below the edge of said platform, said platform being shorter than the severed stock whereby when said gage is lifted the piece of stock will tilt off from the platform on to said shelf, and means operated in synchronism with said shearing means for engaging the sheared stock on said inclined shelf and tilting it over to invert it.

14. An inverting device for shearing presses comprising a receiving platform shorter than the sheared article, means operated in synchronism with the press for holding said article on said platform, an inclined shelf below said platform, means for releasing said article holding means and permitting the article to tip off to said shelf, and means for engaging the article to tip its top edge over its bottom edge while resting on said shelf.

15. A shearing and punching press comprising feed rolls, knife block, die block and gage stop arranged in sequence, means for lifting the gage stop to permit the severed work piece to pass under it, said stop being held up thereby while the work piece is leaving the die block but said stop and work piece dropping together when said work piece leaves the die, and means for stopping the fed rolls when said gage stop drops.

16. A press having a main shaft and press head actuated thereby, a die block, a feed mechanism for feeding strip material to said die block, a knife carried by said press head and working on the feeding side of said die block, a pivoted stop member positioned on the discharge side of said die block, and means actuated from said main shaft for raising said stop member upon the completion of the working stroke of said press head to permit the discharge of the severed article.

17. A press having a main shaft and press head actuated thereby, a die block, a feed mechanism for feeding strip material to said die block, a knife carried by said press head and working on the feeding side of said die block, a pivoted stop member positioned on the discharge side of said die block, and means actuated from said main shaft for raising said stop member upon the completion of the working stroke of said press head to permit the discharge of the severed article, said stop member actuating means permitting said stop to drop into alinement with the end of the strip material being fed upon the discharge of said article from the die block.

18. A press for cutting off blanks from non-rigid strips comprising a stationary knife block having a shearing edge at one end, a movable knife positioned in cooperative relation to said end of the knife block, and means for exerting force upon that portion of the strip overhanging said end of the knife block to overcome the tendency of that portion to bend during the cutting operation, said means being organized to enable movement thereof in timed relation to the motion of the movable knife to provide for the displacement incident to the cutting of strips of substantial thickness, and mechanism for moving said means.

19. In a press for cutting off blanks from non-rigid stock comprising a stationary knife block having a shearing edge at one end and a movable knife positioned in cooperative relation to said end, the combination of movable means arranged adjacent said end of the knife block and arranged to bear against that portion of the stock overhanging the end of the knife block to react against deflection of said overhanging portion of the stock during the cutting operation, means to cause said movable means to so bear against the stock, and means arranged to move said movable means as the movable knife progresses during the shearing operation to compensate for the movement of the strip past the shearing end of the knife block during the progress of the cutting operation.

In testimony whereof, I have signed my name to this specification.

JOSEPH KURKOWSKI.